US010686478B2

(12) United States Patent
Suh et al.

(10) Patent No.: US 10,686,478 B2
(45) Date of Patent: *Jun. 16, 2020

(54) SYSTEM AND METHOD FOR ORTHOGONAL FREQUENCY DIVISION MULTIPLE ACCESS (OFDMA) TRANSMISSION

(71) Applicant: Huawei Technologies Co., Ltd., Shenzhen (CN)

(72) Inventors: Jung Hoon Suh, Kanata (CA); Jiayin Zhang, Shanghai (CN); Osama Aboul-Magd, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,469

(22) Filed: Jun. 28, 2019

(65) Prior Publication Data

US 2019/0334566 A1 Oct. 31, 2019

Related U.S. Application Data

(63) Continuation of application No. 14/823,801, filed on Aug. 11, 2015, now Pat. No. 10,340,964.

(Continued)

(51) Int. Cl.
*H04B 1/12* (2006.01)
*H04L 27/26* (2006.01)
*H04L 5/00* (2006.01)

(52) U.S. Cl.
CPC ............ *H04B 1/12* (2013.01); *H04L 27/2602* (2013.01); *H04L 27/2613* (2013.01); *H04L 5/0048* (2013.01)

(58) Field of Classification Search
CPC . H04L 5/0007; H04L 5/0053; H04L 27/2613; H04L 5/0048; H04L 27/2602;
(Continued)

(56) References Cited

U.S. PATENT DOCUMENTS 8,462,863 B1 6/2013 Zhang et al.
2009/0016371 A1 1/2009 Zheng et al.
(Continued)

FOREIGN PATENT DOCUMENTS

CN 102244607 A 11/2011
CN 102714631 A 10/2012
(Continued)

OTHER PUBLICATIONS

3rd Generation Partnership Project;Technical Specification Group Radio Access Network; Evolved Universal Terrestrial Radio Access (E-UTRA); Physical channels and modulation (Release 12), 3GPP TS 36.211 v12.2.0, Jun. 2014, 121 pages.
(Continued)

*Primary Examiner* — Natasha W Cosme
(74) *Attorney, Agent, or Firm* — Slater Matsil, LLP

(57) ABSTRACT

An OFDMA subframe carrying different data fields in different time segments may include a separate short training field (STF), and a separate set of long training fields (LTFs), for each of the data fields to accommodate time-reuse scheduling. Communicating a separate STF for each data field may allow receivers to re-adjust automatic gain control (AGC) when the data fields carry different numbers of space-time-streams. Likewise, communicating separate sets of LTFs for each data field may allow different beamforming parameters to be applied to different data fields.

20 Claims, 7 Drawing Sheets

Related U.S. Application Data

(60) Provisional application No. 62/038,778, filed on Aug. 18, 2014.

(58) Field of Classification Search
CPC ..... H04L 5/0023; H04L 5/0044; H04L 69/22; H04L 5/0055; H04L 27/2601; H04L 5/0092; H04L 1/0059; H04L 5/0091; H04L 1/00; H04L 1/0042; H04L 1/1685; H04L 27/12; H04L 27/261; H04L 5/0037; H04L 5/0051
USPC ........................................................ 370/330
See application file for complete search history.

(56) References Cited

U.S. PATENT DOCUMENTS

| | | |
|---|---|---|
| 2011/0170627 A1 | 6/2011 | Kwon et al. |
| 2011/0280232 A1 | 11/2011 | Wu et al. |
| 2012/0147866 A1 | 6/2012 | Stacey et al. |
| 2013/0107981 A1 | 5/2013 | Sampath et al. |
| 2014/0169387 A1 | 6/2014 | Kim et al. |
| 2014/0247824 A1 | 9/2014 | Sohn et al. |
| 2014/0328430 A1 | 11/2014 | Park et al. |
| 2015/0139206 A1 | 5/2015 | Azizi et al. |
| 2015/0365203 A1 | 12/2015 | Suh et al. |
| 2015/0365257 A1 | 12/2015 | Suh et al. |
| 2015/0365922 A1 | 12/2015 | Suh et al. |
| 2015/0365947 A1 | 12/2015 | Suh et al. |
| 2016/0072654 A1 | 3/2016 | Choi et al. |

FOREIGN PATENT DOCUMENTS

| | | |
|---|---|---|
| WO | 2013055117 A2 | 4/2013 |
| WO | 2013081364 A1 | 6/2013 |

OTHER PUBLICATIONS

"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz", IEEE P802.11acTM/D3.0, Jun. 2012, 385 pages.

"IEEE Standard for Information technology—Telecommunications and information exchange between systems Local and metropolitan area networks—Specific requirements, Part 11: Wireless LAN Medium Access Control (MAC) and Physical Layer (PHY) Specifications", IEEE Computer Society, IEEE Std 802.11TM-2012, Mar. 29, 2012, 2,793 pages.

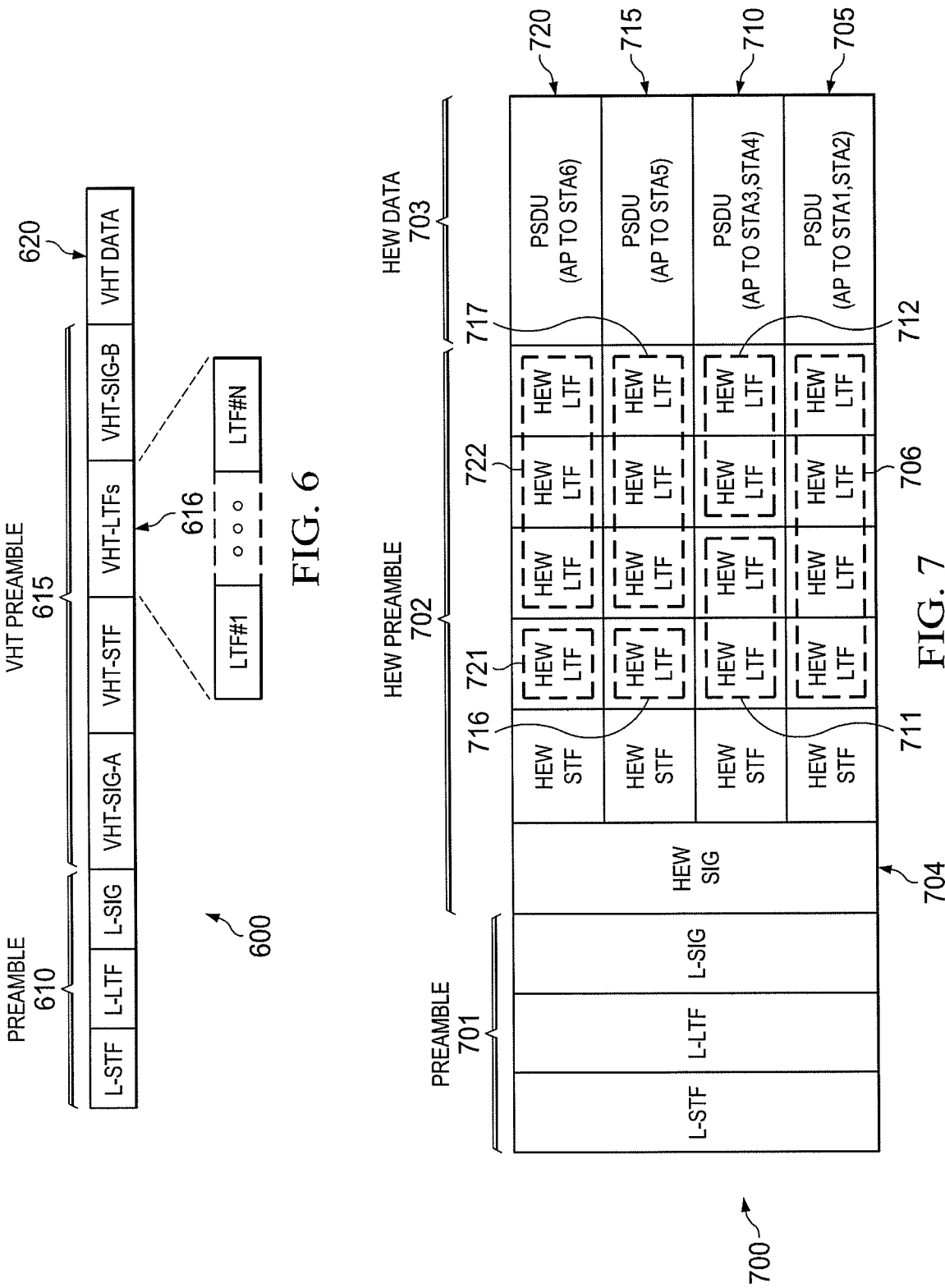

SYSTEM AND METHOD FOR ORTHOGONAL FREQUENCY DIVISION MULTIPLE ACCESS (OFDMA) TRANSMISSION

This patent application is a continuation of U.S. patent application Ser. No. 14/823,801, now U.S. Pat. No. 10,340,964, filed on Aug. 11, 2015 and entitled "System and Method for Orthogonal Frequency Division Multiple Access (OFDMA) Transmission," which claims priority to U.S. Provisional Application No. 62/038,778, filed on Aug. 18, 2014 and entitled "Orthogonal Frequency Division Multiple Access (OFDMA) Frame Structures for Scheduling of Different Stations in a Sub-Channel, Interleaver Designs, and Extended Tone Interleaved Long Training Fields (LTFs)," applications of which are hereby incorporated by reference herein as if reproduced in their entireties.

TECHNICAL FIELD

The present invention relates to telecommunications, and, in particular embodiments, to systems and methods for orthogonal frequency division multiple access (OFDMA) transmission.

BACKGROUND

Orthogonal frequency division multiplexed (OFDM) waveforms are presently used to communicate over Evolved Universal Terrestrial Radio Access (E-UTRA) air interfaces in fourth generation (4G) long term evolution (LTE) networks operating under the communications protocol defined by third generation partnership project (3GPP) technical standard (TS) 36.211 (2008), which is incorporated by reference herein as if reproduced in its entirety. OFDM waveforms provide many advantages over other waveforms, including the ease of implementation using fast Fourier transform (FFT) and inverse FFT (IFFT) and robustness against multi-path fading.

SUMMARY OF THE INVENTION

Technical advantages are generally achieved, by embodiments of this disclosure, which describe systems and methods for orthogonal frequency division multiple access (OFDMA) transmission.

In accordance with an embodiment, a method for performing orthogonal frequency division multiple access (OFDMA) transmissions is provided. In this example, the method includes transmitting a first OFDMA subframe over a wireless network. The first OFDMA subframe carries a first data field in a first time segment of a first OFDMA sub-channel, a second data field in a second time segment of the first OFDMA sub-channel. The first OFDMA subframe further includes a first high efficiency wireless local area network (HE WLAN) (HEW) short training field (STF) for the first data field, a first set of HEW long training fields (LTFs) for the first data field, a second HEW STF for the second data field, and a second set of HEW LTFs for the second data field. An base station for performing this method is also provided.

In accordance with another embodiment, a method for receiving OFDMA transmissions is provided. In this example, the method includes receiving an OFDMA subframe carrying a first data field in a first time segment of an OFDMA sub-channel, and a second data field in a second time segment of the OFDMA sub-channel. The OFDMA subframe further includes a first HEW STF for the first data field, a first set of HEW LTFs for the first data field, a second HEW STF for the second data field, and a second set of HEW LTFs for the second data field. A mobile station for implementing such method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 illustrates a diagram of an embodiment IEEE 802.11 frame structure;

FIG. 7 illustrates a diagram of an embodiment OFDMA frame for aligning the LTF sections of OFDMA subframes in the time domain;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Time-reuse scheduling may allow multiple STAs (or groups of STAs) to receive data in the same OFDMA subframe by partitioning the payload of the OFDMA subframe in the time domain, and then scheduling different STAs (or groups of STAs) to receive data fields in different time segments. Notably, data fields in the same OFDMA subframe may carry different numbers of space-time streams, and may be transmitted using different beamforming parameters.

Aspects of the present disclosure provide an OFDMA subframe structure that includes a separate short training field (STF), and a separate set of long training fields (LTFs), for each data field in an OFDMA subframe to accommodate time-reuse scheduling in the OFDMA subframe. Communicating a separate STF for each data field may allow receivers to re-adjust automatic gain control (AGC) when the data fields carry different numbers of space-time-streams. Likewise, communicating separate sets of LTFs for each data field may allow different beamforming parameters to be applied to different data fields. Throughout this disclosure, the term "a set of LTFs" refers to one or more LTFs, and should not be interpreted as inferring that multiple LTFs are necessarily included in the set of LTFs. Moreover, the terms "space-time streams" and "TX streams" are used interchangeably.

Figure 1:
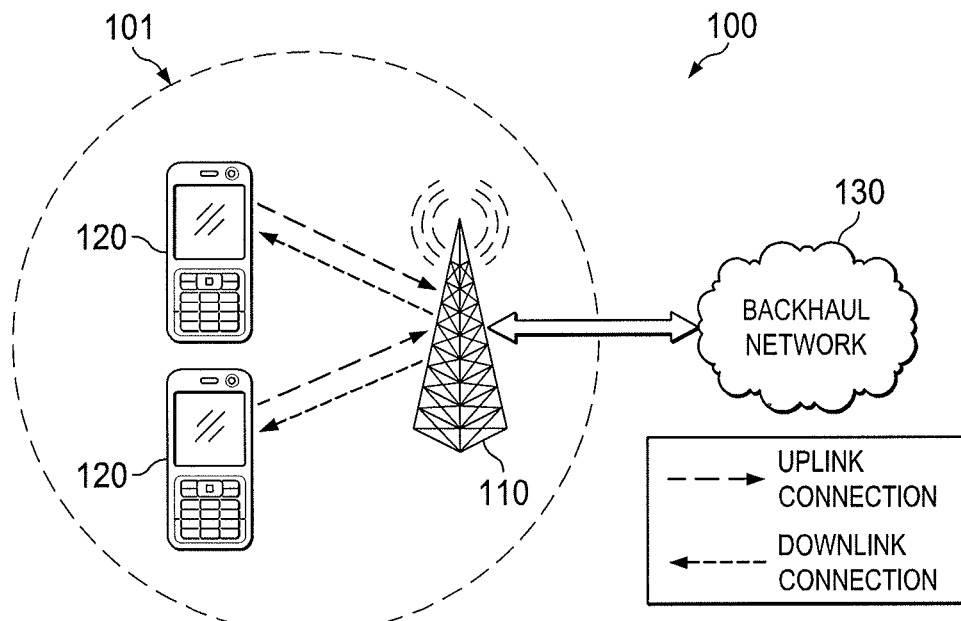
FIG. 1 illustrates a diagram of an embodiment wireless communications network.

FIG. 1 illustrates a network 100 for communicating data. The network 100 comprises a base station 110 having a coverage area 101, a plurality of mobile stations (STAs) 120, and a backhaul network 130. As shown, the base station 110 establishes uplink (dashed line) and/or downlink (dotted line) connections with the mobile stations 120, which serve to carry data from the mobile stations 120 to the base station 110 and vice-versa. Data carried over the uplink/downlink connections may include data communicated between the mobile stations 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile station" refers to any component (or collection of components) capable of establishing a wireless connection with a base station, such as a user equipment (UE), a mobile device, and other wirelessly enabled devices. In some embodiments, the network 100 may comprise various other wireless devices, such as relays, low power nodes, etc.

Time domain granularity in the Wi-Fi OFDMA Resource Unit (RU) design was proposed in U.S. Provisional Patent Application No. 62/028,208 filed Jul. 23, 2014 and entitled "System and Method for OFDMA Resource Allocation" and U.S. Provisional Patent Application No. 62/028,174 filed Jul. 23, 2014 and entitled "System and Method for Orthogonal Frequency Division Multiple Access," both of which are incorporated by reference herein as if reproduced in their entireties. Time granularity provides for efficient scheduling of STAs with short or long packets in both time and frequency domains.

Figure 2:
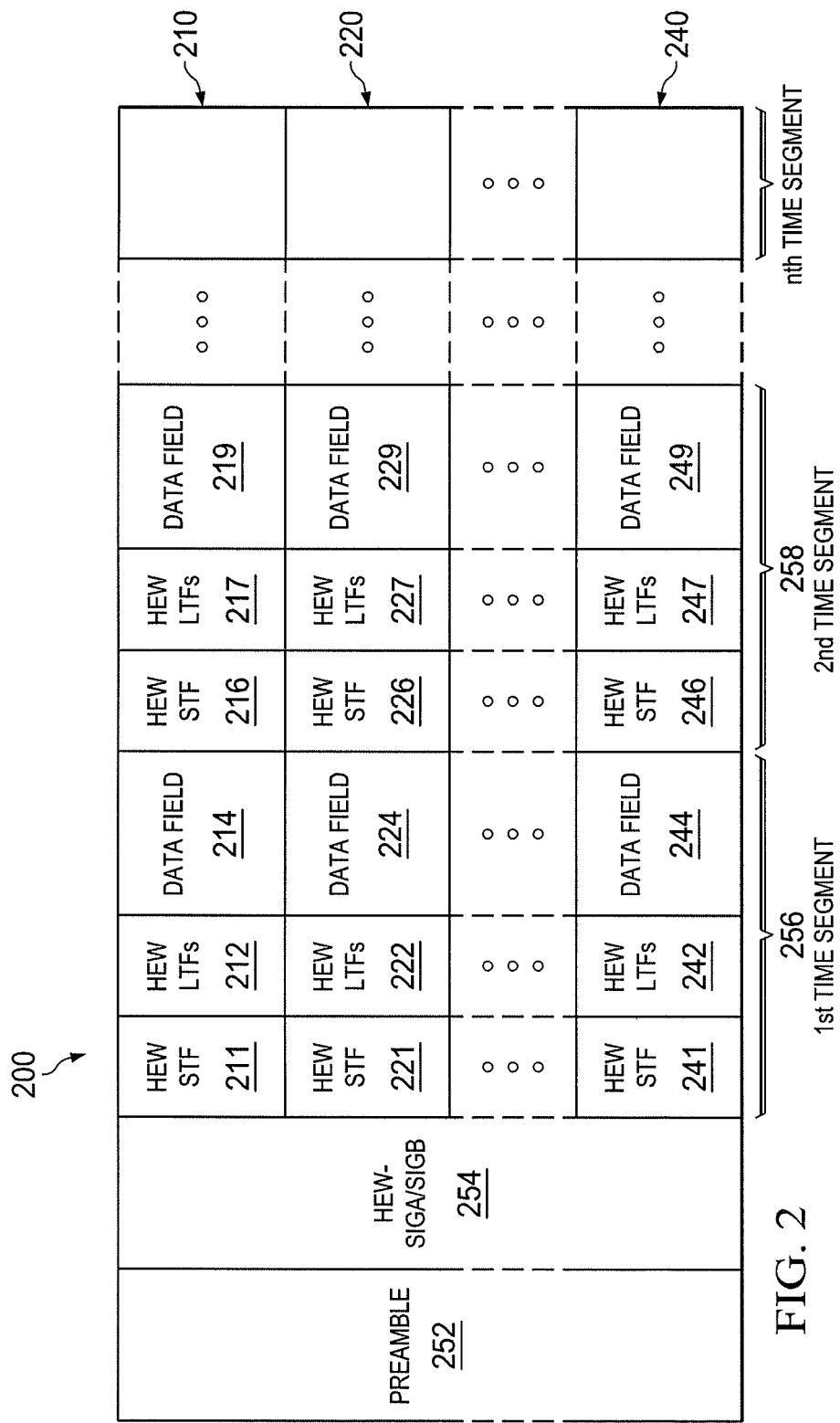
FIG. 2 illustrates a diagram of an embodiment down-link (DL) OFDMA frame structure.

When multiple STAs are scheduled in different time segments of a sub-channel, different numbers of TX streams may be applied to different data fields carried in the different time segments. In this case, it may be helpful to have a separate short training field (STF) to re-adjust automatic gain control (AGC) for different time segments. Moreover, since different beamforming (BF) parameters may be applied to the different data fields, it may also be helpful to have a separate set of long training fields (LTFs) for each data field. FIG. 2 illustrates an embodiment downlink (DL) OFDMA frame structure 200 for accommodating time-reuse scheduling. The embodiment DL OFDMA frame structure 200 includes a mid-amble type of OFDMA frame structure.

As shown, the embodiment DL OFDMA frame structure 200 comprises a plurality of OFDMA subframes 210, 220, 240 communicated over different sub-channels. Each of the OFDMA subframes 210, 220, 240 includes a preamble field 252, a high efficiency wireless local area network (HE WLAN) (HEW)—SIGA/SIGB field 254, and a payload. The preamble field 252 may carry information for mobile stations operating in accordance with Institute of Electrical and Electronics Engineers (IEEE) 802.11n, such as information related to base station identification and selection, frame time and frequency synchronization, and channel estimation. In one example, the preamble field 252 carries STFs and LTFs in accordance with IEEE 802.11n. The payloads of the OFDMA subframes are divided into n time segments 256, 258. The payloads of the OFDMA subframes 210, 220, 240 carry HEW STFs 211, 221, 241, sets of HEW LTFs 212, 222, 242, and data fields 214, 224, 244 in the first time segment 256, and HEW STFs 216, 226, 246, sets of HEW LTFs 217, 227, 247, and data fields 219, 229, 249 in the second time segment 258. Each HEW STF and each set of HEW LTFs are used to decode the data field in their respective sub-channels and time segments. Throughout this disclosure, the terms "HE WLAN" and "HEW" are used interchangeably.

As can be seen from FIG. 2, in each time segment, each data field has a corresponding HEW STF and a corresponding set of HEW LTFs right before the respective data field, that is, the HEW STF and the set of HEW LTFs precede the corresponding data field in the time segment. For example, the HEW STF 211 and the set of HEW LTFs 212 of the first time segment 256 in the sub-frame 210 precede the data field 214. Likewise, the HEW STF 216 and the set of HEW LTFs 217 in the second time segment 258 precede the data field 219 of the sub-frame 210. Since the AGC re-adjustment is done in the time domain, HEW STFs may be aligned in the time domain over the whole bandwidth. In the example depicted in FIG. 2, the HEW STFs are aligned in each time segment across the different sub-channels. In one embodiment, padding may be used to align the end of the data fields in a time segment, so that the HEW STFs of the next time segment can be aligned. In other examples, HEW STFs are not aligned in the time domain.

Figure 3:
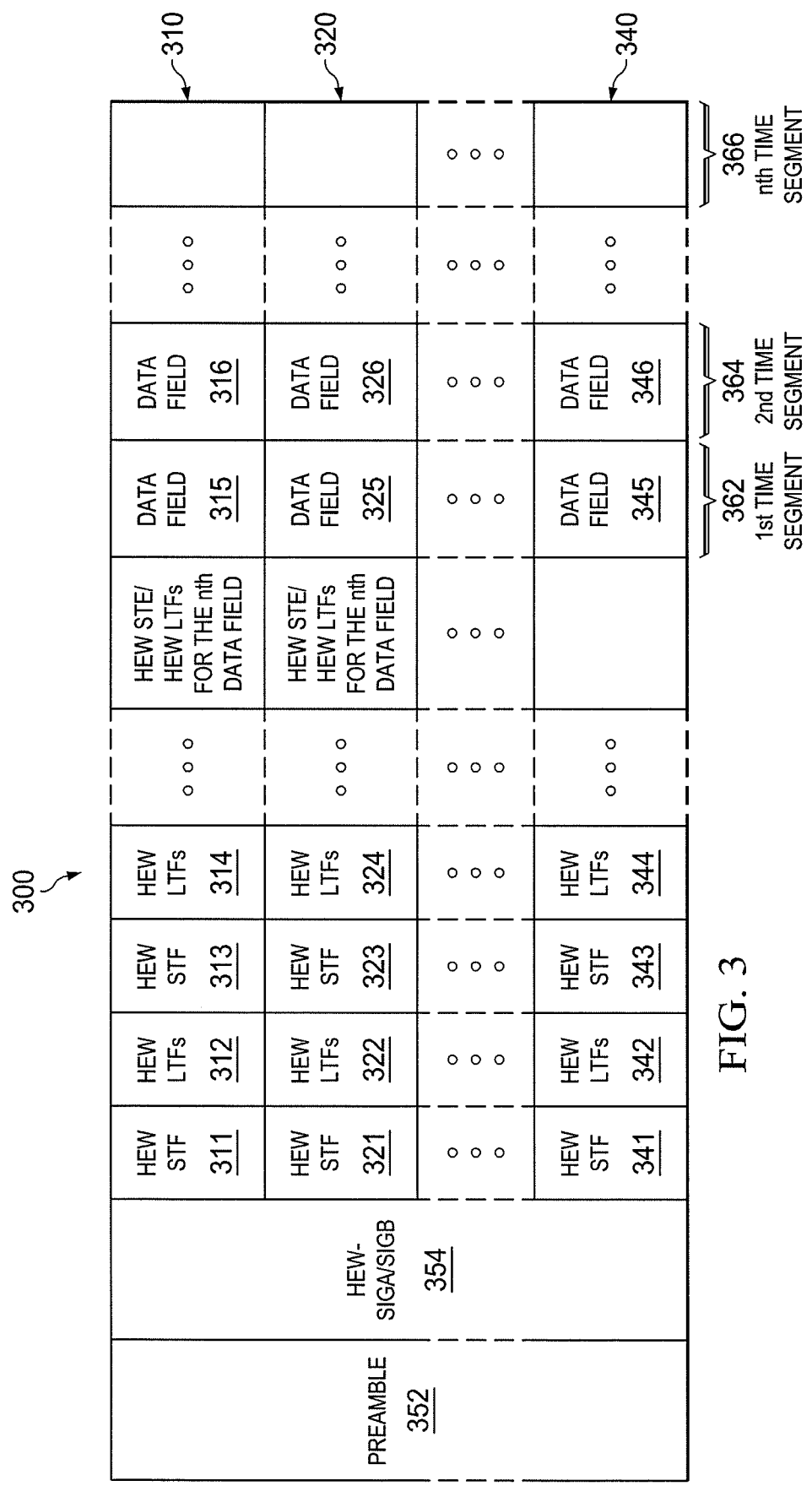
FIG. 3 illustrates a diagram of another embodiment down-link (DL) OFDMA frame structure.

FIG. 3 illustrates another embodiment DL OFDMA frame structure 300 for accommodating the time-reuse scheduling of sub-channels. The embodiment DL OFDMA frame structure 300 includes a multi-amble type of OFDMA frame structure. The DL OFDMA frame structure 300 includes a plurality of OFDMA subframes 310, 320, 340 communicated over different sub-channels. Each of the OFDMA subframes 310, 320, 340 includes a preamble field 352, a HEW-SIGA/SIGB field 354, and a payload. The preamble field 352 may be similar to the preamble field 252 in the embodiment DL OFDMA frame structure 200.

The payload of each of the OFDMA subframes 310, 320, 340 carries a plurality of data fields, as well as a separate HEW STF and a separate set of HEW LTFs for each of the data fields. Each data field in a sub-channel is carried in a different one of the time segments 362, 364, 366. Each HEW STF and set of HEW LTFs includes signaling that is used to decode the corresponding data field. As shown, all of the HEW STFs and HEW LTFs in the OFDMA subframes precede the corresponding data fields. The HEW STF 311, 321, 341 and the sets of HEW LTFs 312, 322, 342 carry signaling that is used to decode the data fields 315, 325, 345 carried in the time segment 362, respectively, while the HEW STF 313, 323, 343 and the sets of HEW LTFs 314, 324, 344 carry signaling that is used to decode the data fields 316, 326, 346 carried in the time segment 364, respectively.

Figure 4:
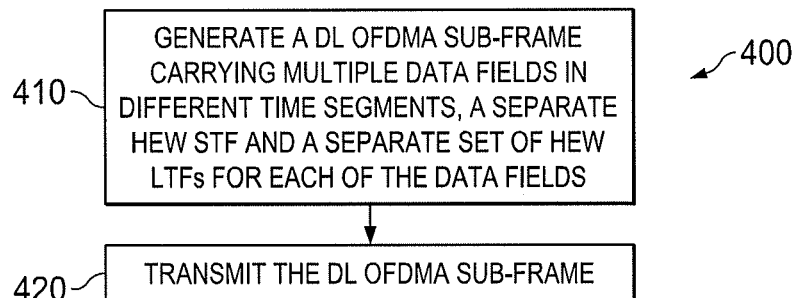
FIG. 4 illustrates a flow chart of an embodiment method for transmitting a down-link (DL) OFDMA subframe.

FIG. 4 is a flow chart illustrating an embodiment method 400 for communicating a DL OFDMA frame. The method 400 begins at step 410, where a base station generates a DL OFDMA sub-frame that carries multiple data fields in different time segments, as well as a separate HEW STF and a separate set of HEW LTFs for each of the data fields. Each data field may be scheduled to be received by one or more mobile stations, and different data fields may be scheduled to be received by different mobile stations or groups of mobile stations. Different data fields may be transmitted using different beamforming parameters. A set of HEW LTFs for a data field may be transmitted using the same beamforming parameters as the data field. The DL OFDMA sub-frame is then transmitted to the scheduled STAs at step 420.

Figure 5:
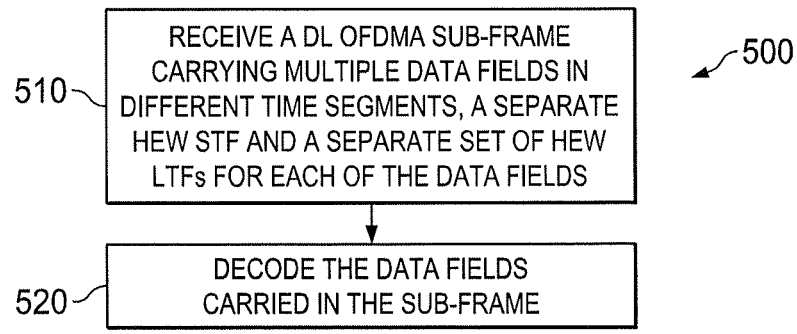
FIG. 5 illustrates a flow chart of an embodiment method for communicating a down-link (DL) OFDMA subframe.

FIG. 5 is a flow chart illustrating another embodiment method 500 for communicating a DL OFDMA sub-frame. The method 500 begins at step 510, where a user equipment receives a DL OFDMA sub-frame that carries multiple data fields in different time segments, as well as a separate HEW STF and a separate set of HEW LTFs for each of the data fields. The user equipment uses the HEW STFs and the sets of HEW LTFs to decode the corresponding data fields carried in different time segments at step 520.

The OFDMA frame structures described herein are not limited to DL transmissions, and may be adapted for UL and D2D transmissions. For example, an UL OFDMA frame structure similar to that depicted in FIGS. 2-3 may be used to accommodate the time-reuse scheduling of different STAs per sub-channel. In an embodiment, an Ack message may be first scheduled in an UL frame for those STAs who have received a DL packet. Thereafter, the time reuse property is used to schedule the UL STAs using a similar OFDMA frame structure.

In conventional IEEE 802.11 networks, the number of LTFs included in a frame is generally determined by the number of space-time streams (STSs) carried in the frame. More specifically, IEEE 802.11ac requires one LTF for frames carrying one STS, two LTFs for frames carrying two STSs, four LTFs for frames carrying three or four STSs, six LTFs for frames carrying five or six STSs, and eight LTFs for frames carrying seven or eight STSs. U.S. patent application Ser. No. 14/720,680 filed on May 22, 2015 and entitled "System and Method for OFDMA Resource Allocation", which is incorporated by reference herein as if reproduced in its entirety, provides methods to increase channel estimation performance by including more LTFs in a frame than required by IEEE 802.11ac for the number of STSs carried in the frame. For example, a base station may transmit at least two LTFs in a frame carrying one STS, at least three LTFs in a frame carrying two STSs, at least five LTFs in a frame carrying three or four STSs, and at least seven LTFs in a frame carrying five or six STSs. In such examples, these additional LTFs may provide improved channel estimation performance.

FIG. 6 is a diagram of an embodiment IEEE 802.11 frame structure 600. As shown, the frame structure 600 comprises a preamble 610, a VHT preamble 615, and VHT data payload 620. The preamble field 610 may be similar to the preamble field 252 in the embodiment DL OFDMA frame structure 200. The VHT preamble 615 may include multiple VHT-LTFs. The VHT payload 620 may carry multiple STSs to STAs in a cell. Channel estimation performance may be improved by including more VHT-LTFs in the frame than required by IEEE 802.11ac for the number of STSs carried in the frame. For example, a base station may transmit at least two VHT-LTFs 616 in a frame carrying one STS, at least three VHT-LTFs 616 in a frame carrying two STSs, at least five VHT-LTFs 616 in a frame carrying three or four STSs, at least seven VHT-LTFs 616 in a frame carrying five or six STSs, and at least nine VHT-LTFs 616 in a frame carrying seven or eight STSs. In one embodiment, the VHT-LTFs 616 may include at least two more VHT-LTFs than STSs carried in the frame. For example, the base station may transmit at least four VHT-LTFs 616 in a frame carrying two STSs and at least six VHT-LTFs 616 in a frame carrying three or four STSs. In another embodiment, the base station may transmit at least twice as many VHT-LTFs 616 as STSs used to communicate the frame. For example, the base station may transmit at least two VHT-LTFs 616 in a frame carrying one STS.

FIG. 7 is a diagram of an embodiment OFDMA frame 700 for aligning LTF sections of OFDMA subframes in the time domain. As shown, the embodiment OFDMA frame 700 comprises a plurality of OFDMA subframes 705, 710, 715, 720 communicated over different sub-channels. Each of the OFDMA subframes 705, 710, 715, 720 includes a preamble 701, a HEW preamble 702, and a HEW data region 703. The preamble field 701 may be similar to the preamble field 252 in the embodiment DL OFDMA frame structure 200. The HEW data region 703 may carry physical layer convergence protocol service data units (PSDUs) destined for one or more STAs.

The OFDMA subframes 705, 710, 715, 720 may carry different numbers of STSs in the HEW data region 703. In this example, the OFDMA sub-frame 705 carries two STSs for each of a first STA (STA1) and a second STA (STA2). The OFDMA sub-frame 710 carries one STS for each of a third STA (STA3) and a fourth STA (STA4). The OFDMA subframes 715, 720 each carry one STS for a fifth STA (STA5) and a sixth STA (STA6), respectively.

Notably, while the OFDMA subframes 705, 710, 715, 720 carry different numbers of STSs, they nevertheless include the same number of HEW-LTFs. More specifically, the number of HEW-LTFs carried in each OFDMA sub-frame is determined by the number of HEW-LTFs needed for the OFDMA sub-frame carrying the most STSs. In this example, the OFDMA sub-frame 705 carries the highest number of STSs (i.e., 4 STSs), and consequently the number of HEW-LTFs carried by the OFDMAs sub-frame 710, 715, 720 are determined based on the number of HEW-LTFs needed for the OFDMA sub-frame 705 (i.e., 4 HEW-LTFs). Put differently, IEEE 802.11ac requires four HEW-LTFs 706 to communicate the OFDMA sub-frame 705 carrying four STSs, two HEW-LTFs 711 to communicate the OFDMA sub-frame 710 carrying two STSs, one HEW-LTF 716 to communicate the OFDMA sub-frame 715 carrying one STS, and one HEW-LTF 721 to communicate the OFDMA sub-frame 720 carrying one STS. The embodiment frame format provided herein includes two additional HEW-LTFs 712 in the OFDMA sub-frame 710, and three additional HEW-LTFs 717, 722 in each of the OFDMA subframes 715, 720, so that the LTF sections of the OFDMA subframes 710, 715, 720 align with the LTF section of the OFDMA sub-frame 705. Accordingly, LTF sections in the OFDMA subframes 705, 710, 715, 720 may be aligned in the time domain by virtue of the same number of LTFs having been generated for each of the OFDMA subframes. Advantageously, the additional HEW-LTFs 712, 717, 722 carried by the OFDMA subframes 710, 715, 720 provide for improved channel estimation upon reception.

In a multi-preamble type of DL OFDMA frame structure, the HEW-STFs and the sets of HEW-LTFs precede the data fields carried in a sub-frame. The numbers of HEW-STFs, as well as the number of sets of HEW-LTFs, depend on how many data fields are carried in the sub-frame. Respective sets of HEW-LTFs in different subframes may be aligned in the time domain using LTF extension techniques described above. For example, if two subframes carry data fields in the same time slot that are transmitted using different numbers of TX streams, then a first data field (e.g., the data field transmitted using more TX streams) may require more LTFs than a second data field transmitted using fewer TX streams). LTF extension may be achieved by including extra LTFs in the set of LTFs corresponding to the second data field such that the sets of LTFs for both data fields have the same number of LTFs. In this way, the sets of LTFs may have the same length, and may therefore be aligned in the time domain. The additional LTFs in the set of LTFs for the second data field may allow for improved channel estimation by mobile stations scheduled to receive data in the second data field. Thus, the extra LTF fields may not be considered wasteful overhead, and may provide performance benefits over zero padding. The performance improvement with the p-matrix LTF extension was demonstrated in U.S. Provisional Patent Application No. 62/028,174.

U.S. Provisional Patent Application No. 62/028,208 proposed an OFDMA RU to be composed of 26 subcarriers by 8 symbols. Aspects of this disclosure provide an Interleaver/de-interleaver pair with the 26×2 symbols, 26×4 symbols, or 26×8 symbols unit. Since the size of an Interleaver/de-interleaver unit is 52, 104, or 208 in BPSK and 1 Spatial stream, it is possible to re-use the current 802.11 20 MHz Interleaver. However, the input bits may be read into the embodiment Interleaver column by column, and may be written into the input port of 802.11 20 MHz Interleaver, row by row. As for de-interleavers, the procedure will be opposite. The output bits out of the current 802.11 20 MHz de-interleaver can be read out row by row, and written onto the output port of the embodiment de-interleaver.

Figure 8:
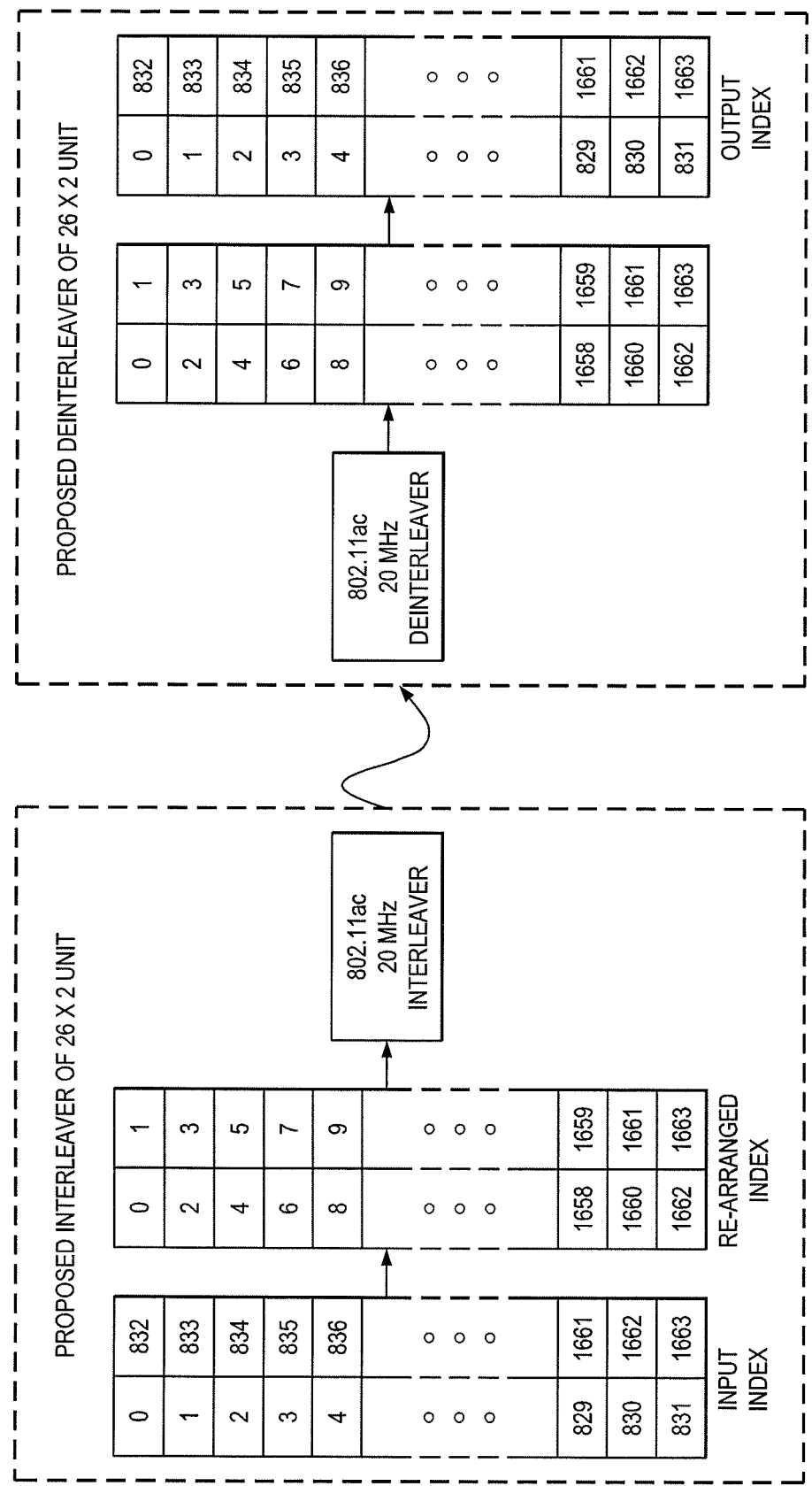
FIG. 8 illustrates a diagram of an embodiment interleaver design.

In one example, a 26×2 unit Interleaver is provided. In case of 16-QAM and 8 spatial stream case, a 26×2×4 (4 bits per 16-QAM)×8 (8 spatial streams) binary bit stream is provided (that is, 1664 total bits). Since there are two columns in case of 26×2 unit Interleaver, total 1664 binary bits are serially taken, and the index of which are re-arranged as the even numbered index first and the odd numbered index the following. The even index (0, 2, 4, etc.) is first and the odd index (e.g., 1, 3, 5, etc.) follows. The index of incoming binary bits can be re-arranged, after which the 802.11 20 MHz Interleaver can be operated/run with the same NCOL, NROW, NROT, ISS parameters used in the 802.11 specification. The de-interleaver procedure will be the opposite. The de-interleaver will take the incoming data and run through the 802.11 20 MHz de-interleaver with the same parameters as in the 802.11 specification. The index of this output data will be re-arranged. The de-interleaver output will be passed over to the next function block, channel decoder. FIG. 8 shows the graphical representation of the given example above.

Embodiment interleavers may provide diversity over the OFDM(A) symbols, that is, time. The existing interleaver in 802.11ac provides the interleaving over the frequency tones and spatial domain (over the multiple streams). Embodiment interleavers provide the interleaving over the symbols in addition to over the frequency tones, and spatial streams.

Aspects of this disclosure provide performance improvement with the tone interleaved LTF when using more LTFs than are otherwise required. In the current 802.11 specification, the number of long training fields (LTF) is determined by the number of TX (Transmission) space-time streams or the number of TX antennas (in case of Channel Sounding). That is, in case the number of TX space-time streams is 1, 2, 3, 4, 5, 6, 7, or 8, the number of LTFs is required to be 1, 2, 4, 4, 6, 6, 8, or 8, respectively, corresponding to the number of TX space-time streams above in the 802.11ac specification.

Aspects of this disclosure introduce embodiment LTF designs including a tone interleaved LTF (TIL), in which a similar principle to decide the number of LTFs may be applied. Aspects of this disclosure use interpolation techniques to estimate the channel using the TIL. A smaller number of LTFs may be used when applying an interpolation scheme to estimate the channel.

Aspects of this disclosure extend the number of LTFs even with the TIL. The same number of LTFs as the number of TX space-time streams (STS) for down-link (DL) or the number of STAs for up-link (UL) may be doubled like the p-matrix based LTFs. That is, for 4 TX STS in case of DL or for 4 STAs in case of UL, it may be possible to use 4 TILs to estimate the channel without interpolation. However, it when 8 TILs for 4 TX STS (DL case) or 4 STAs (UL case) are used, it is possible to achieve approximately 1.5 dB Packet Error Rate (PER) Performance gain.

Aspects of this disclosure may use more LTFs than required to achieve the error rate performance improvement even with the TIL. For example, for 2 TX space-time streams (for DL), 2 LTFs may be enough to estimate the channel with the TIL, but embodiment we apply 4 LTFs to achieve better performance for the 2 TX streams case. The same principle may be applied to the different number of TX streams or to the UL transmission.

Figure 9:
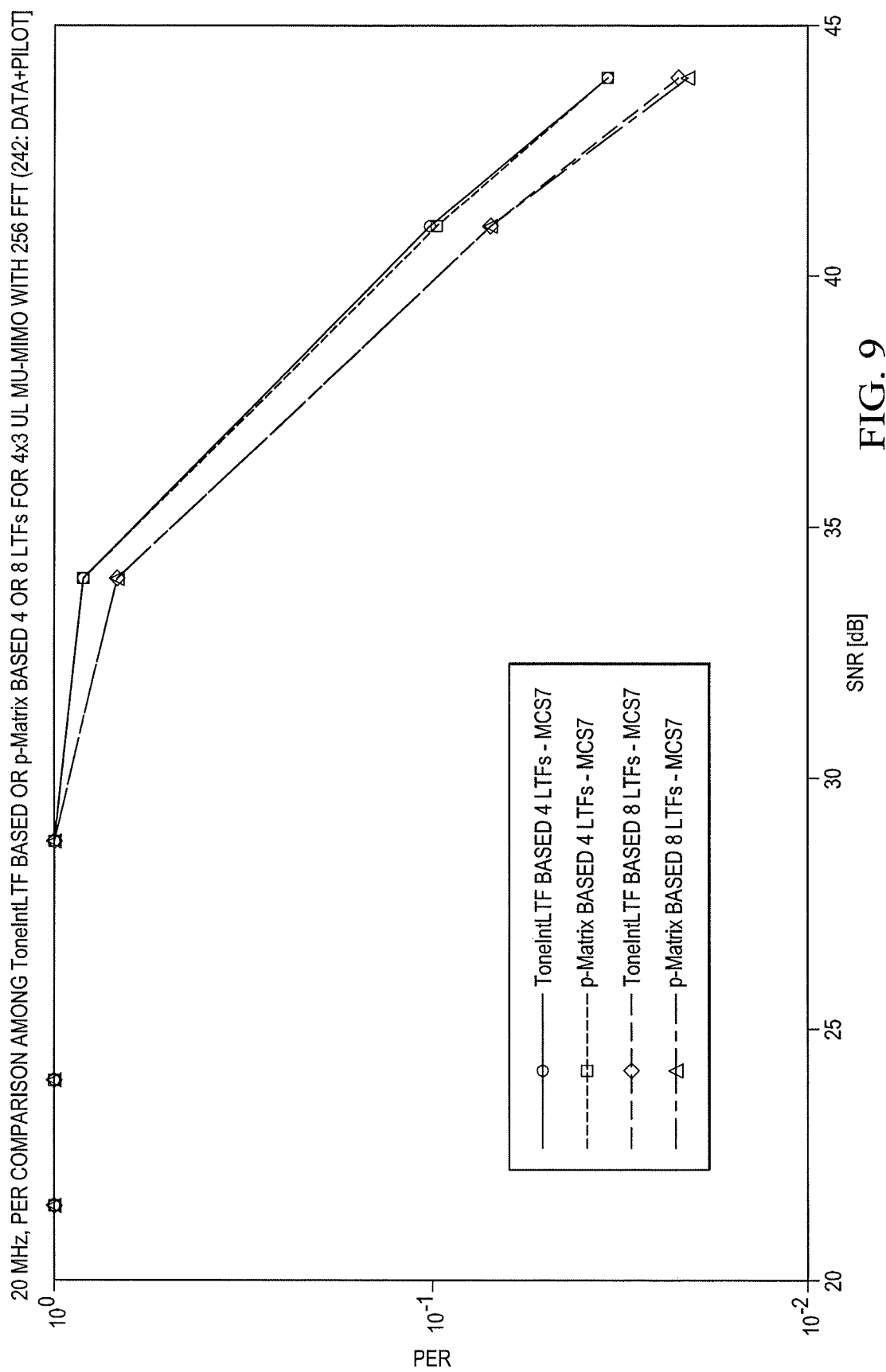
FIG. 9 illustrates a graph of simulation results for embodiment long training field (LTF) configurations.

FIG. 9 illustrates a graph of simulation results showing the Packet Error Rate (PER) comparison between with 4 LTFs and with 8 LTFs for both TIL based Channel estimation and p-matrix based Channel estimation. The simulation is run for the UL MU-MIMO system with 3 STAs, each having 1 TX antenna and stream over the IEEE channel D. The AP has 4 RX antennas. As shown, the same UL MU-MIMO system with 8 LTFs shows the 1.5 dB gain over the UL MU-MIMO with 4 LTFs.

Aspects of this disclosure provide embodiment OFDMA Acknowledgement Procedures. In wireless LAN setup, the integrity of the transmitted data frames is acknowledged by the receiver by sending an ACK frame or a Block ACK (BA) frame back to the sender. An ACK frame provides the acknowledgement for a single data unit, while a BA frame provides the acknowledgement for a block of data units. Additionally acknowledgements may be sent immediately after the reception of the data unit (or a block of data units) or they may be sent as a response to a Block ACK Request (BAR) sent by the transmitter. The type of the ACK is determined by the ACK policy bits in the QoS Control field.

Figure 10:
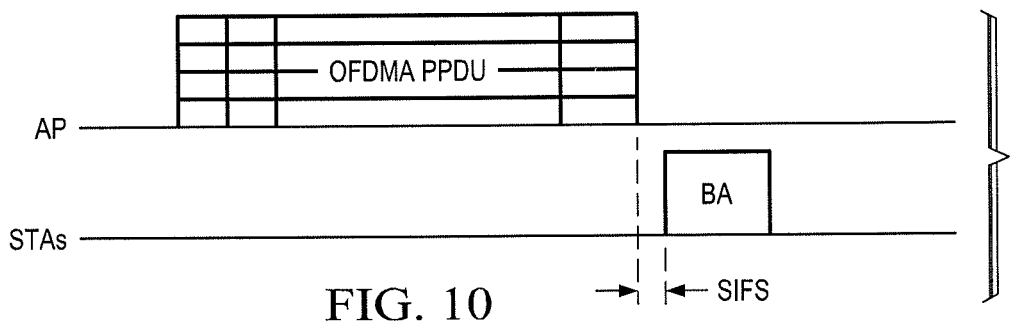
FIG. 10 illustrates a diagram of an embodiment acknowledgement procedure.
Figure 11:
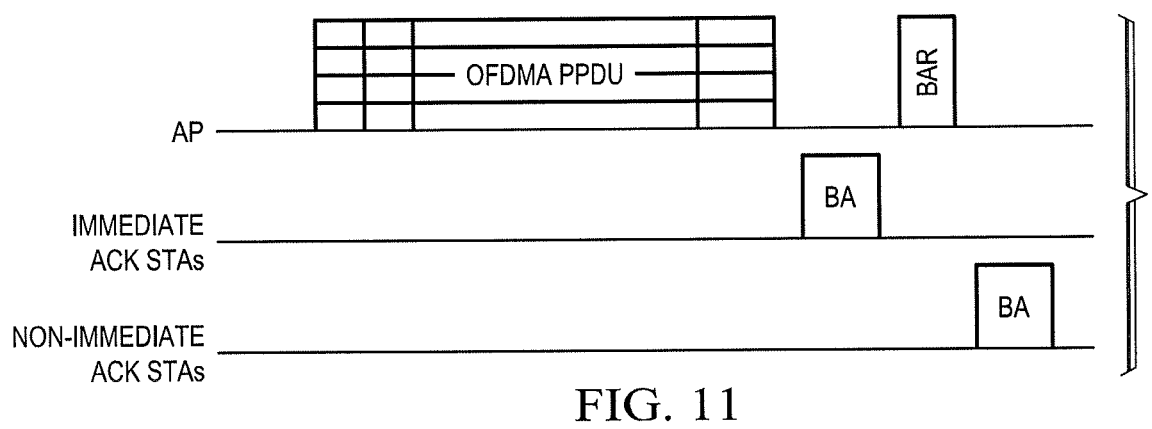
FIG. 11 illustrates a diagram of another embodiment acknowledgement procedure.

Aspects of this disclosure provide two embodiment methods for OFDMA ACK procedure, namely an immediate acknowledgement procedure and a non-immediate or mixed acknowledgement procedure. FIG. 10 illustrates a diagram of an embodiment immediate acknowledgement procedure. In order to have OFDMA Immediate Acknowledgement, all data units in the OFDMA PPDU may have their ACK policy indicating this variant of the ACK (by setting bit #5 to zero and bit #6 to zero in the QoS Control field). With OFDMA Immediate Acknowledgements, stations (STAs) that have received data units from the AP starts sending their BA using UL OFDMA format Short Inter-Frame spacing (SIFS) time units after the conclusion of the OFDMA PPDU. They use the same sub-carriers used by the AP to transmit their respective data units. Regarding non-immediate (mixed) acknowledgements. In different scenarios where not all the data units are requesting immediate acknowledgements, the AP may use BAR frames in order to solicit acknowledgements from STAs that are not requesting immediate ACKs. FIG. 11 illustrates a diagram of an embodiment OFDMA Mixed Acknowledgement. STAs for which immediate ACK indication is set starts sending their BA frames SIFS time after the end of the OFDMA PPDU. STAs for which the immediate ACK indication is not set waits for a BAR frame received from the AP. Both the BAR and the BA frames are sent using OFDMA format.

Figure 12:
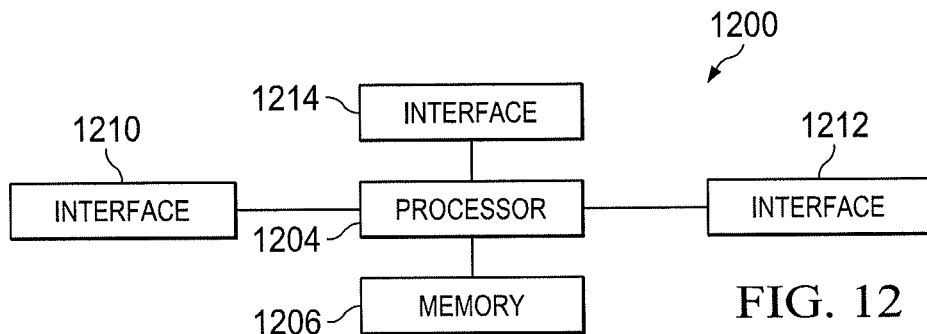
FIG. 12 illustrates a diagram of an embodiment processing system.

FIG. 12 illustrates a block diagram of an embodiment processing system 1200 for performing the methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
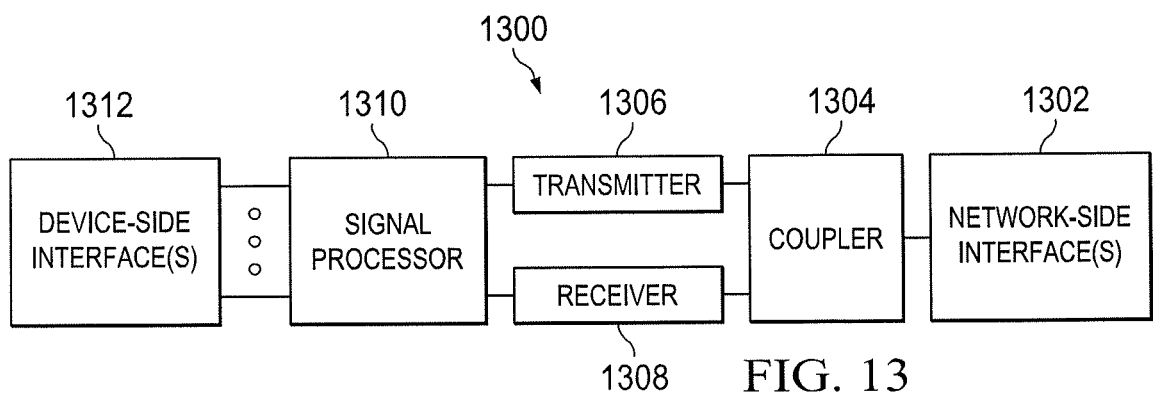
FIG. 13 illustrates a diagram of an embodiment transceiver.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
receiving, by an access point (AP), a first uplink (UL) orthogonal frequency division multiple access (OFDMA) sub-frame over a wireless network, wherein the first UL OFDMA sub-frame carries a first data field from a first station (STA) in a first time segment of a first OFDMA sub-channel, a second data field from a second STA in a second time segment of the first OFDMA sub-channel, a first high efficiency wireless local area network (HE WLAN) (HEW) short training field (STF) for the first data field, a first set of HEW long training fields (LTFs) for the first data field, a second HEW STF for the second data field, and a second set of HEW LTFs for the second data field.

2. The method of claim 1, wherein the first HEW STF and the first set of HEW LTFs precede the first data field in the time domain, and the second HEW STF and the second set of HEW LTFs are positioned in between the first data field and the second data field in the time domain.

3. The method of claim 1, wherein each of the first HEW STF, the first set of HEW LTFs, the second HEW STF and the second set of HEW LTFs precede all data fields carried by the first UL OFDMA sub-frame in the time domain.

4. The method of claim 1, wherein the first UL OFDMA sub-frame comprises a preamble field and a HEW SIGA/SIGB field, the preamble field carrying information for mobile stations operating in accordance with Institute of Electrical and Electronics Engineers (IEEE) 802.11n.

5. The method of claim 1, further comprising:
receiving, by the AP, a second UL OFDMA sub-frame over the wireless network, wherein the second UL OFDMA sub-frame carries a third data field in the first time segment of a second OFDMA sub-channel, a fourth data field in the second time segment of the second OFDMA sub-channel, a third HEW STF for the third data field, a third set of HEW LTFs for the third data field, a fourth HEW STF for the fourth data field, and a fourth set of HEW LTFs for the fourth data field, wherein the third HEW STF is aligned with the first HEW STF in the time domain, and the fourth HEW STF is aligned with the second HEW STF in the time domain.

6. The method of claim 5, wherein the first set of HEW LTFs is aligned with the third set of HEW LTFs in the time domain, and the second set of HEW LTFs is aligned with the fourth set of HEW LTFs in the time domain.

7. The method of claim 1, wherein the first data field is scheduled to be received by a different mobile station than the second data field.

8. The method of claim 1, wherein the first data field is received using different beamforming parameters than the second data field.

9. The method of claim 8, wherein the first set of HEW LTFs is received using the same beamforming parameters as the first data field, and wherein the second set of HEW LTFs is received using the same beamforming parameters as the second data field.

10. An access point (AP) comprising:
a processor; and
a computer readable storage medium storing programming for execution by the processor, the programming including instructions to:
receive a first uplink (UL) orthogonal frequency division multiple access (OFDMA) sub-frame, wherein the first UL OFDMA sub-frame carries a first data field from a first station (STA) in a first time segment of a first OFDMA sub-channel, a second data field from a second STA in a second time segment of the first OFDMA sub-channel, a first high efficiency wireless local area network (HE WLAN) (HEW) short training field (STF) for the first data field, a first set of HEW long training fields (LTFs) for the first data field, a second HEW STF for the second data field, and a second set of HEW LTFs for the second data field.

11. The AP of claim 10, wherein the first HEW STF and the first set of HEW LTFs precede the first data field in the time domain, and the second HEW STF and the second set of HEW LTFs are positioned in between the first data field and the second data field in the time domain.

12. The AP of claim 10, wherein each of the first HEW STF, the first set of HEW LTFs, the second HEW STF and the second set of HEW LTFs precede all data fields carried by the first UL OFDMA sub-frame in the time domain.

13. The AP of claim 10, wherein the first UL OFDMA sub-frame carries a preamble field and a HEW SIGA/SIGB field, the preamble field carrying information for mobile stations operating in accordance with Institute of Electrical and Electronics Engineers (IEEE) 802.11n.

14. The AP of claim 10, wherein the programming includes instructions to:
receive a second UL OFDMA sub-frame, the second UL OFDMA sub-frame carrying a third data field in the first time segment of a second OFDMA sub-channel, a fourth data field in the second time segment of the second OFDMA sub-channel, a third HEW STF for the third data field, a third set of HEW LTFs for the third data field, a fourth HEW STF for the fourth data field, and a fourth set of HEW LTFs for the fourth data field, wherein the third HEW STF is aligned with the first HEW STF in the time domain, and the fourth HEW STF is aligned with the second HEW STF in the time domain.

15. The AP of claim 14, wherein the first set of HEW LTFs is aligned with the third set of HEW LTFs in the time domain, and the second set of LTFs is aligned with the fourth set of HEW LTFs in the time domain.

16. The AP of claim 10, wherein the first data field is scheduled to be received by a different mobile station than the second data field.

17. The AP of claim 10, wherein the first data field is received using different beamforming parameters than the second data field.

18. The AP of claim 17, wherein the first set of HEW LTFs is received using the same beamforming parameters as the first data field, and wherein the second set of HEW LTFs is received using the same beamforming parameters as the second data field.

19. A method comprising:
transmitting, by a first station (STA), information in an uplink (UL) orthogonal frequency division multiple access (OFDMA) sub-frame, wherein the UL OFDMA sub-frame carries a first data field from the first STA in a first time segment of an OFDMA sub-channel, a second data field from a second STA in a second time segment of the OFDMA sub-channel, a first high efficiency wireless local area network (HE WLAN) (HEW) short training field (STF) for the first data field, a first set of HEW long training fields (LTFs) for the first data field, a second HEW STF for the second data field, and a second set of HEW LTFs for the second data field.

20. A first station (STA) comprising:
a processor; and
a computer readable storage medium storing programming for execution by the processor, the programming including instructions to:
transmit information in an uplink (UL) orthogonal frequency division multiple access (OFDMA) subframe, wherein the UL OFDMA sub-frame carries a first data field from the first STA in a first time segment of an OFDMA sub-channel, a second data field from a second STA in a second time segment of the OFDMA sub-channel, a first high efficiency wireless local area network (HE WLAN) (HEW) short training field (STF) for the first data field, a first set of HEW long training fields (LTFs) for the first data field, a second HEW STF for the second data field, and a second set of HEW LTFs for the second data field.

* * * * *